United States Patent
Pereira

(10) Patent No.: US 12,553,477 B2
(45) Date of Patent: Feb. 17, 2026

(54) FRICTION CLUTCH SYSTEM

(71) Applicant: Volvo Car Corporation, Gothenburg (SE)

(72) Inventor: Luiz Filipe Silva Pereira, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 17 days.

(21) Appl. No.: 18/618,289

(22) Filed: Mar. 27, 2024

(65) Prior Publication Data

US 2024/0328466 A1    Oct. 3, 2024

(30) Foreign Application Priority Data

Mar. 27, 2023 (EP) ..................................... 23164348

(51) Int. Cl.
  *F16D 13/56*   (2006.01)
  *F16D 13/58*   (2006.01)
  *F16D 13/70*   (2006.01)

(52) U.S. Cl.
  CPC ........... *F16D 13/56* (2013.01); *F16D 13/583* (2013.01); *F16D 13/70* (2013.01)

(58) Field of Classification Search
  CPC ........ F16D 13/56; F16D 13/69; F16D 13/583; F16D 13/70; F16D 2013/565; F16D 25/0638; F16D 25/12
  See application file for complete search history.

(56) References Cited

U.S. PATENT DOCUMENTS

| | | | |
|---|---|---|---|
| 4,676,356 A | 6/1987 | Beccaris et al. | |
| 6,026,944 A * | 2/2000 | Satou | F16D 13/52 192/70.28 |
| 8,162,119 B2 | 4/2012 | Matsuda | |
| 8,272,489 B2 | 9/2012 | Gokan et al. | |
| 10,837,499 B2 | 11/2020 | Imanishi et al. | |
| 11,401,980 B2 | 8/2022 | Seki et al. | |
| 2002/0020601 A1* | 2/2002 | Martin | F16D 13/69 192/70.28 |
| 2012/0228077 A1* | 9/2012 | DeGowske | F16D 13/683 192/70.11 |

(Continued)

OTHER PUBLICATIONS

Search report issued for EP Application No. 23164348.7, mailed on Sep. 19, 2023, 7 pages.

*Primary Examiner* — Lori Wu
(74) *Attorney, Agent, or Firm* — Raj S. Dave; Dave Law Group LLC

(57) ABSTRACT

According to an embodiment, it is a clutch arrangement comprising a first rotating means with at least one friction unit and a second rotating means with at least one pressure unit; wherein the friction unit is configured to be moved between an opened position and a closed position, wherein in the closed position, a force is transmitted between the first rotating means and the second rotating means and wherein in the opened position, no force is transmitted between the first rotating means and the second rotating means; at least one shim means arranged at the first rotating means, whereby the shim means are configured to prevent a contact between the friction unit and the pressure unit, when the friction unit is in the opened position; and wherein the clutch arrangement is configured to be a component of a vehicle.

20 Claims, 7 Drawing Sheets

(56) References Cited

U.S. PATENT DOCUMENTS

2016/0376720 A1* 12/2016 Heitzenrater ......... F16H 57/032
                                                    74/606 R
2018/0252273 A1*  9/2018 Friess ................... F16D 13/648
2022/0221009 A1   7/2022 Moens et al.

* cited by examiner

FRICTION CLUTCH SYSTEM

CROSS-REFERENCE TO RELATED APPLICATIONS

This application claims the benefit of European Patent Application Number 23164348.7, filed on Mar. 27, 2023, which is hereby incorporated by reference in its entirety.

TECHNICAL FIELD

The present disclosure relates to a clutch arrangement for a vehicle, a vehicle for route planning, a vehicle with a clutch arrangement and/or a use of a shim means in a clutch arrangement.

BACKGROUND ART

Known clutch arrangements comprise wet clutches, which due to their frictional properties help to avoid Noise, Vibration, and Harshness (NVH) vibration effects during shifting, whereby typically high losses occur due to drag torques caused by viscous coupling through the oil between the moving elements. Alternatively, dry clutch arrangements are possible using, for example, organic friction material whereby NVH effects such as vibration harshness effects and/or noise harshness effects occur due to the friction material.

In the proposed concepts, the material is used in a multi-plate design whereby another source of loss is actuation, with most of these multi-plate clutch packs requiring a constant applied force to transmit torque. This consumes energy, but also results in bearing losses due to axial force.

In view of this, it is found that a further need exists to provide an improved clutch arrangement for a vehicle.

SUMMARY

In the view of the above, it is an object of the present disclosure to provide an improved clutch arrangement for a vehicle.

The problem is at least partially solved or alleviated by the subject matter of the independent claims of the present disclosure, whereby further examples are incorporated in the dependent claims.

According to a first aspect, a clutch arrangement for a vehicle is disclosed, comprising: a first rotating means with at least one friction unit and a second rotating means with at least one pressure unit; whereby the at least one friction unit is configured to be moved between an opened position and a closed position, whereby in the closed position, a force is transmitted between the first rotating means and the second rotating means and whereby in the opened position, no force is transmitted between the first rotating means and the second rotating means; at least one shim means arranged at the first rotating means, whereby the shim means are configured to prevent a contact between the friction unit and the pressure unit, if the friction unit is located in the opened position.

The first rotating means and/or the second rotating means may be an element configured to rotate about a first axis and/or a second axis. Further, the first rotating means and the second rotating means may be arranged in order to rotate about the same axis.

The at least one friction unit may be an element configured to absorb and/or transmit friction, for example, the element may be configured as a friction disk.

The at least one pressure unit may be an element configured to absorb and/or transmit pressure, for example, the element may be configured as a pressure plate.

The at least one shim means may be an element configured to position the at least one friction unit such that no contact occurs between the friction unit and the pressure unit in the open position.

Moreover, in the closed position, a force is transmitted between the at least one friction unit of the first rotating means and the at least one pressure unit of the second rotating means and whereby in the opened position, no force is transmitted between the at least one friction unit of the first rotating means and the at least one pressure unit of the second rotating means.

Furthermore, the at least one shim means may be configured to prevent impacts between the at least one friction unit and the at least one pressure unit when the clutch arrangement is in the opened position. In other words, the at least one shim means may be configured to prevent the at least one friction unit and the at least one pressure unit from freely impacting each other if the clutch arrangement is open.

As a result, but not limited to, by using the disclosed clutch arrangement for example, the drag loss due to the usage of wet clutch arrangements may be avoided, as well as NVH effects of known dry clutch arrangement, such as in particular vibration harshness effects and/or noise harshness effects. Here, for example, the NVH effects may be reduced by arranging the at least one friction unit and/or the at least one pressure unit separately from each other and defining the relative position between the at least one friction unit and the at least one pressure unit with the at least one shim means.

In an implementation, the clutch arrangement may comprise two or more friction units and two or more pressure units, preferably five friction units and five pressure units.

Therefore, the clutch arrangement may for example be configured as a multi-disc clutch or multi-plate clutch.

Thereby, the at least one shim means may for example arrange a first friction unit opposite a first pressure unit opposite a second friction unit and so on.

The arrangement with the shim means may, for example, prevent the five friction units and five pressure units from colliding with each other, thus achieving improved NVH compared to regular clutch arrangements or multi clutch arrangements.

In an implementation, the clutch arrangement may further comprise at least one first separator means located between two pressure units and configured to position the two pressure units apart from each other.

The at least one first separator means may be an element configured to position the two pressure units apart from each other, for example, the element is configured as a separator spring.

In other words, the separator spring may arrange the pressure units with a controlled gap between each other to may be reduce the drag in the clutch arrangement.

Furthermore, the gap may be divided by the force and tolerance of the plates and/or the separator spring.

In an implementation, the clutch arrangement may further comprise at least one second separator means configured to position the two friction units apart from each other.

The at least one second separator means may be an element configured to position the two friction units apart from each other, for example, the element is configured as a snap ring.

In an implementation, the at least one shim means and/or the at least one second separator means may be configured to provide a gap between the at least one friction unit and the at least one pressure means.

In other words, the at least one first separator means may form the friction units into a first block and the pressure units into a second block, whereby the at least one shim means and the at least one second separator means may create a relative position between the first block and the second block.

Furthermore, the gap may prevent drag torque in the clutch arrangement.

In an implementation, the clutch arrangement may be a normally closed clutch, i.e. a clutch arrangement, which is configured to be initially in the closed position. In other words, a clutch arrangement, which may be configured to be s so called closed clutch, which is initially in the closed position.

For example, the clutch arrangement may be predefined in the closed position to transmit a force between the first rotating means and the second rotating means, and the coupling arrangement may be configured such that no force has to be applied or introduced to the coupling arrangement in order to maintain it in the predefined closed position. In addition, the clutch arrangement may be configured to apply or include a force to the clutch arrangement in order to move the clutch arrangement to the open position.

For example, a normally closed clutch may be affected by a normally closed force, which keeps the normally closed clutch in the closed position. The normally closed force may for example be provided by a spring element and thus counteract an opening of the normally closed clutch. The normally closed clutch may for example be configured in the closed position to transmit a drive force.

Furthermore, in order to open a normally closed clutch, an opening force may be applied which may counteract the normally closed force and may be higher than the normally closed force.

Therefore, for example, the normally closed clutch may transmit the driving force without an actuating force being applied, whereby in order to shift the normally closed clutch from the closed position to the open position, an actuating force in the form of the opening force may be applied.

In other words, a normally closed clutch may provide the advantage of not consuming actuation power when closed and therefore it may be beneficially for the use in a two-speed electronically axle, since the two-speed electronically axle may always be driven in one of the speeds.

In an implementation, the clutch arrangement may further comprise at least one spring unit for holding the clutch arrangement in a closed position.

The at least one spring unit may be configured to generate a spring force, for example it may be configured as a disc spring or diaphragm spring.

In other words, the disk spring may be arranged at the rear of a clutch carrier of the clutch arrangement, whereby a tab of an application ring is guided through slots at the rear of the clutch carrier. As a result, a constant clamping force may be applied to the friction system through slots on the clutch carrier, whereby when released, the diaphragm spring returns to its position.

Further, the at least one spring unit may be located at the back side of the clutch carrier due to higher stiffness of the backside.

In an implementation, the spring unit may comprise two or more spring elements.

The spring unit with two or more spring elements may be a configured as a coil spring unit.

The two or more spring elements may provide the benefit of a larger gap between the at least on friction unit and the at least on pressure unit due to the arrangement of the springs around the rivets at the back the clutch carrier and the apply ring. As further, there may be less trade-off between load and travel of the springs.

Furthermore, the two or more springs may provide a monotonically increasing load vs displacement characteristic which may lead to a better controllability of the clutch arrangement.

In addition, the clutch arrangement may not require thrust bearings since each rotating member is constrained on its shaft and any force reaction occurs at the gearbox bearings, whereby a load on the clutch arrangement may be reduced if a lever ratio is provided to reduce the load. This may minimize an axial force application to gearbox bearings, which also leads to a reduction of the generated losses.

In an implementation, the clutch arrangement may further comprise an actuating element.

The actuating element may be a cover of the clutch arrangement and/or parts of the clutch arrangement.

In an implementation, the actuating element may comprise at least one coating material that prevents the build-up of hysteresis.

The actuating element may comprise a low friction coating material between the carrier and the actuator to prevent hysteresis to build up.

In an implementation, the at least one spring unit and/or the actuating element may be arranged to the second rotating means.

In an implementation, the clutch arrangement is may further comprise at least one concentric shaft on which the first rotating means and/or the second rotating means is/are arranged.

The concentric shaft may be configured to carry clutch input member and/or clutch output member, so that thrust bearings, for example, are not needed for the use of the clutch arrangement. In addition, the force required to actuate the clutch arrangement may be reduced by the lever ratio of the at least one spring unit.

Therefore, forces to actuate the clutch assembly may also be reduced since thrust bearings are not required and/or lower actuation forces may reduce losses at the shaft bearings if the clutch is connected to the shaft.

A further aspect of the present disclosure relates to a vehicle comprising the at least one disclosed clutch arrangement.

Vehicle may be broadly understood and construed whereby it may comprise, but is not limited to, automobiles and/or aircraft, as well as other vehicles that utilize a clutch arrangement.

A further aspect of the present disclosure relates to a use of the at least one disclosed shim means in the disclosed clutch arrangement.

According to an embodiment, it is a clutch arrangement comprising a first rotating means with at least one friction unit and a second rotating means with at least one pressure unit; wherein the friction unit is configured to be moved between an opened position and a closed position, wherein in the closed position, a force is transmitted between the first rotating means and the second rotating means and wherein in the opened position, no force is transmitted between the first rotating means and the second rotating means; at least one shim means arranged at the first rotating means, whereby the shim means are configured to prevent a contact between the friction unit and the pressure unit, when the friction unit is in the opened position; and wherein the clutch arrangement is configured to be a component of a vehicle.

According to an embodiment, it is a vehicle comprising a clutch arrangement, wherein the clutch arrangement comprises a first rotating means with at least one friction unit and a second rotating means with at least one pressure unit; wherein the friction unit is configured to be moved between an opened position and a closed position, wherein in the closed position, a force is transmitted between the first rotating means and the second rotating means and wherein in the opened position, no force is transmitted between the first rotating means and the second rotating means; and at least one shim means arranged at the first rotating means, whereby the shim means are configured to prevent a contact between the friction unit and the pressure unit, when the friction unit is in the opened position.

According to an embodiment, it is a method comprising, opening a closed clutch of a clutch arrangement by applying an actuating force configured to counteract a closed force of the closed clutch; wherein the clutch arrangement comprises a first rotating means with at least one friction unit and a second rotating means with at least one pressure unit; wherein the friction unit is configured to be moved between an open position and a closed position; and at least one shim means arranged at the first rotating means, whereby the shim means are configured to prevent a contact between the friction unit and the pressure unit, when the friction unit is in the open position; wherein the method is configured for use of the shim means in the clutch arrangement.

BRIEF DESCRIPTION OF DRAWINGS

In the following, the disclosure is described exemplarily with reference to the enclosed figures, in which.

Notably, the figures are merely schematic representations and serve only to illustrate examples of the present disclosure. Identical or equivalent elements are in principle provided with the same reference signs.

DETAILED DESCRIPTION

Figure 1:
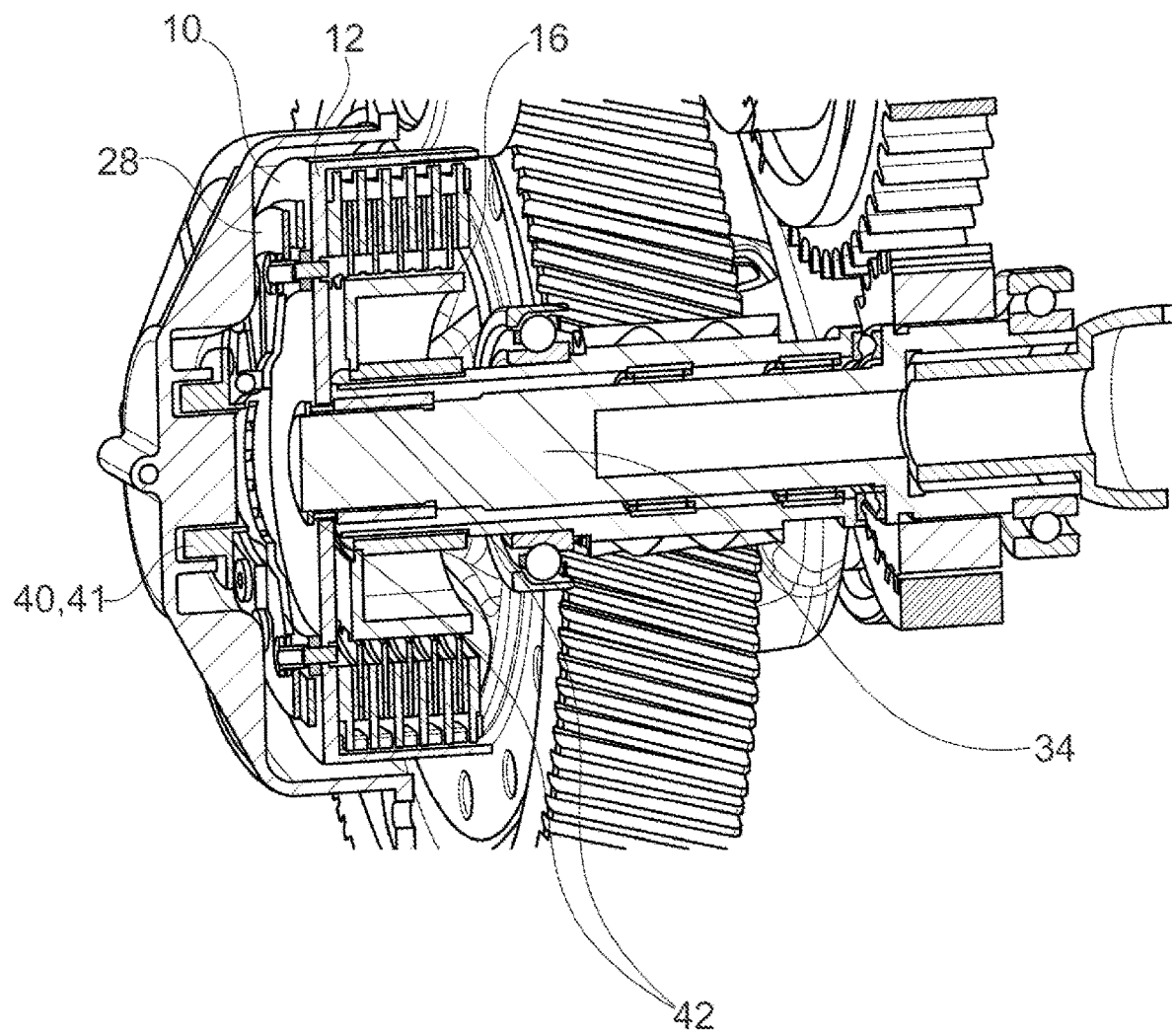
FIG. 1 is a schematic illustration showing a first overview of the disclosed arrangement in a system.
Figure 2:
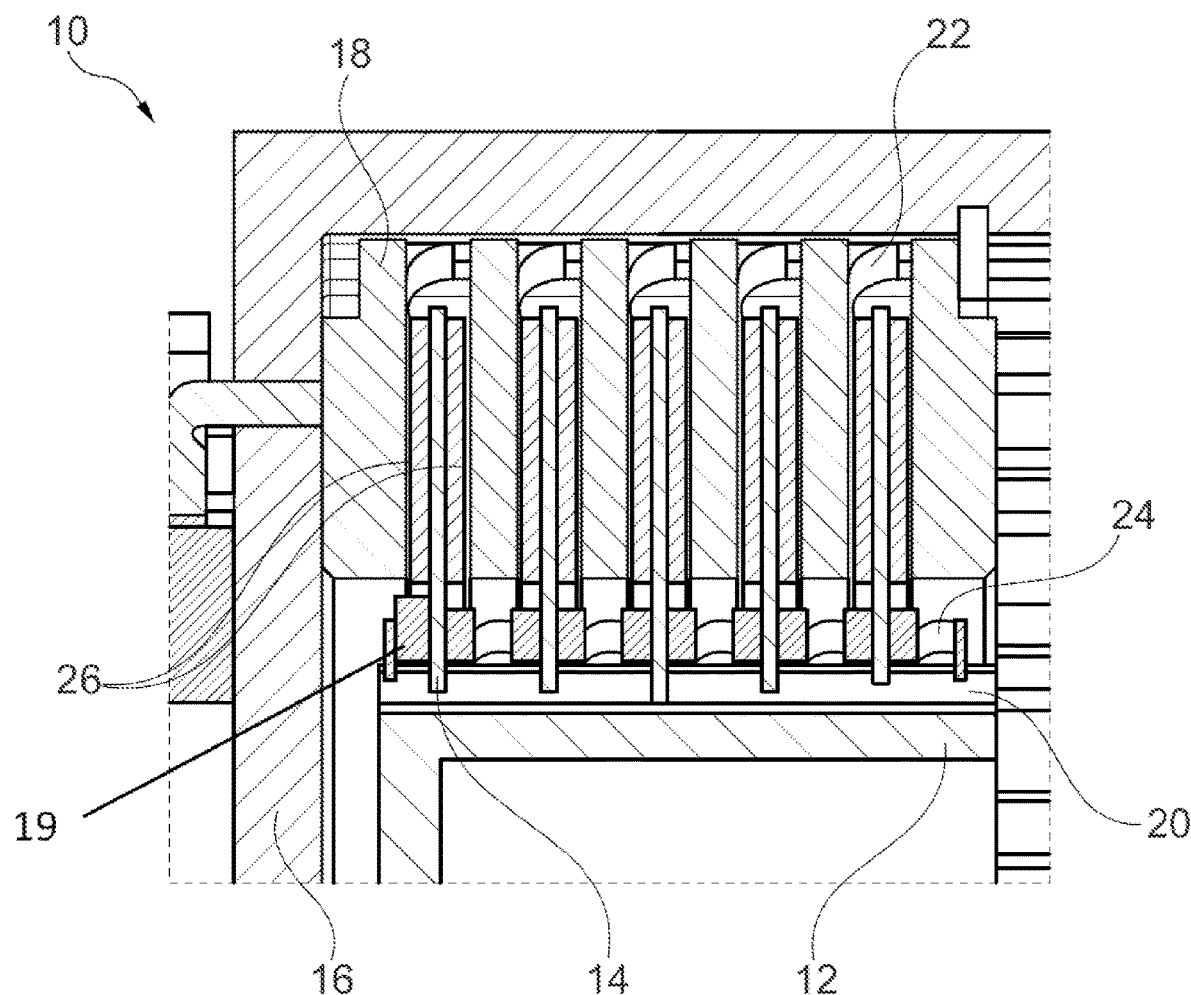
FIG. 2 is a schematic illustration showing a second overview of the disclosed system.

FIG. 1 and FIG. 2 shows a schematic illustration showing a first and second overview of the disclosed clutch arrangement 10 in a system, comprising: a first rotating means 12 with five friction units 14 and a second rotating means 16 with six pressure units 18; whereby the five friction units 14 are configured to be moved between an opened position and a closed position, whereby in the closed position, a force is transmitted between the first rotating means 12 and the second rotating means 16 and whereby in the opened position, no force is transmitted between the first rotating means 12 and the second rotating means 16; ten shim means 19 arranged at the first rotating means, whereby the ten shim means 19 are configured to prevent a contact between the five friction units 14 and the six pressure units 18, if the five friction units 14 are located in the opened position.

In addition, the ten shim means 19 are connected and/or fixed to the first rotating means 12 by means of holding units 24.

Further, the clutch arrangement 10 comprises five first separator means 22 located between the six pressure units 18 and configured to position the five pressure units 18 apart from each other.

Further, the clutch arrangement 10 comprises a second separator means 20 configured to position the five friction units 14 apart from each other.

Further, whereby the ten shim means 19 and/or the second separator means 20 are configured to provide a gap 26 between the five friction units 14 and the six pressure units 18.

Further, the clutch arrangement 10 is a normally closed clutch, which is initially in the closed position.

Further, the clutch arrangement 10 is further comprising at least one spring unit 28 for holding the clutch arrangement 10 in a closed position.

Further, the clutch arrangement 10 comprises at least one concentric shaft 34 on which the first rotating means 12 and/or the second rotating means 16 is/are arranged.

Further, the at least one spring unit 28 is arranged to the second rotating means 16.

Moreover, a clutch piston 40, a release bearing 41 and clutch input and output members 42 are shown, whereby the clutch input and output members 42 are tightened to the concentric shafts 34 to reduce number of bearings and reduce loses.

Figure 3:
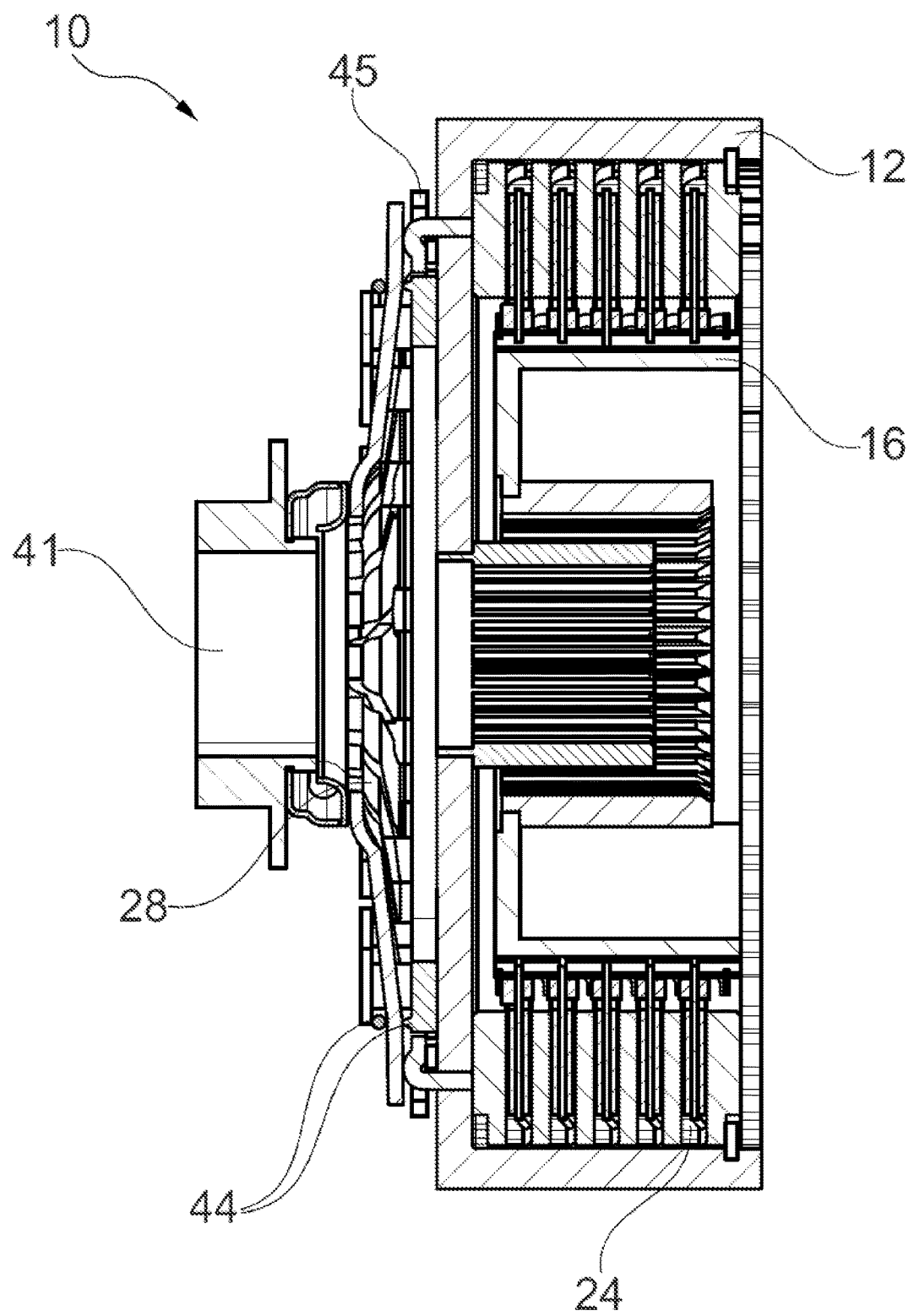
FIG. 3 is a schematic illustration showing a third overview of the disclosed arrangement.

FIG. 3 shows a schematic illustration showing a third overview of the disclosed arrangement 10 of FIG. 1 or FIG. 2, whereby it further shows a release bearing 41, rivets 43, pivots 44 and an apply ring 45.

Furthermore, the rivets 43 attach the spring unit 28 and its pivots 44 to a clutch carrier of the clutch arrangement 10 and the spring unit 28 applies the load to the apply ring 45, which compresses the friction pack comprising the five friction units 14 and six pressure units 18.

Therefore, to release the clutch arrangement 10, the release bearing is actuated and the gap 26 is created between the spring unit 28 and the apply ring 45. The five first separator means 22 between the five pressure units 18 will push the apply ring 45 back.

Figure 4:
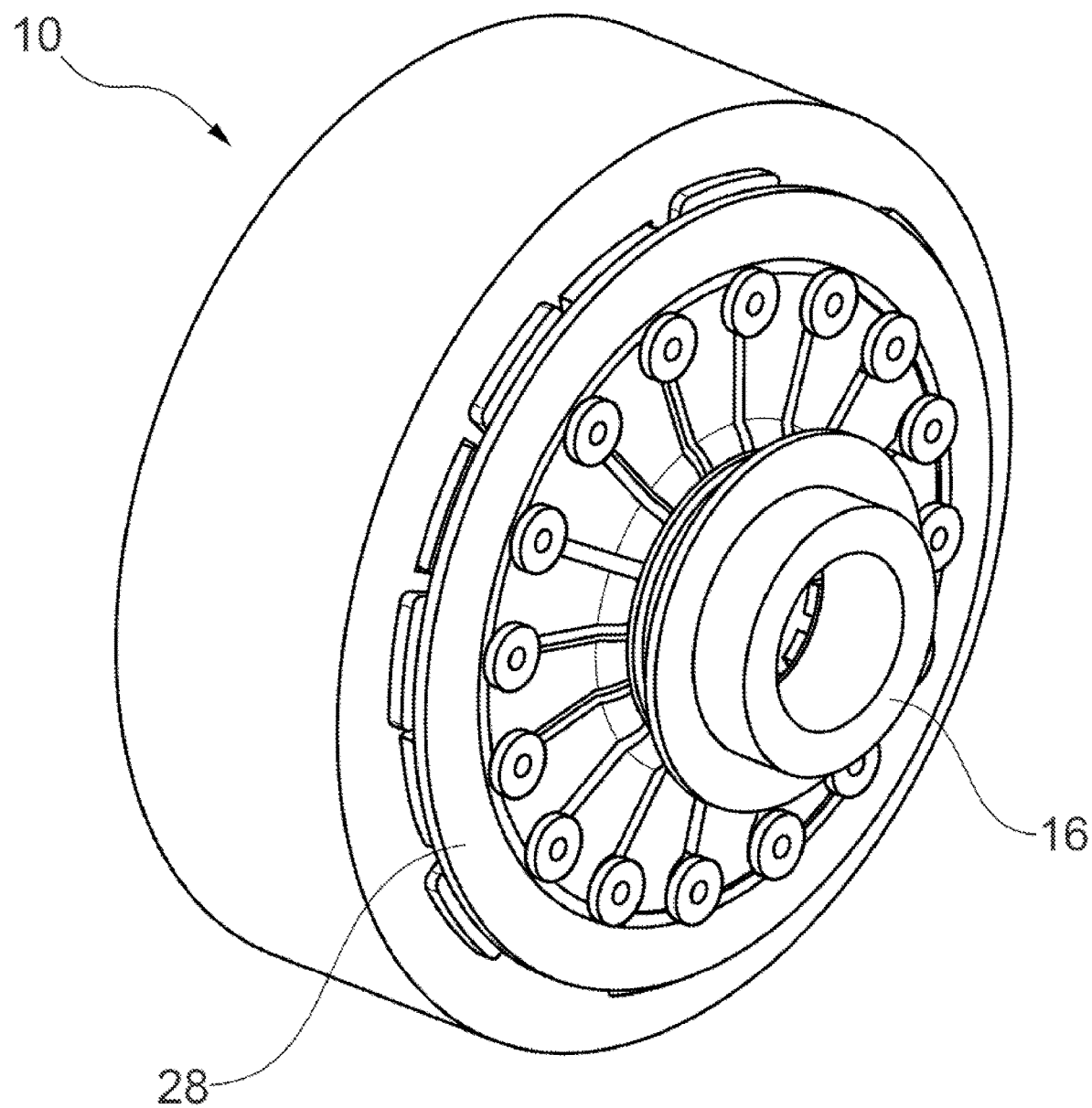
FIG. 4 is a schematic illustration showing a fourth overview of the disclosed arrangement.

FIG. 4 is a schematic illustration showing a fourth overview of the disclosed arrangement 10 of FIGS. 1 to 3.

Figure 5:
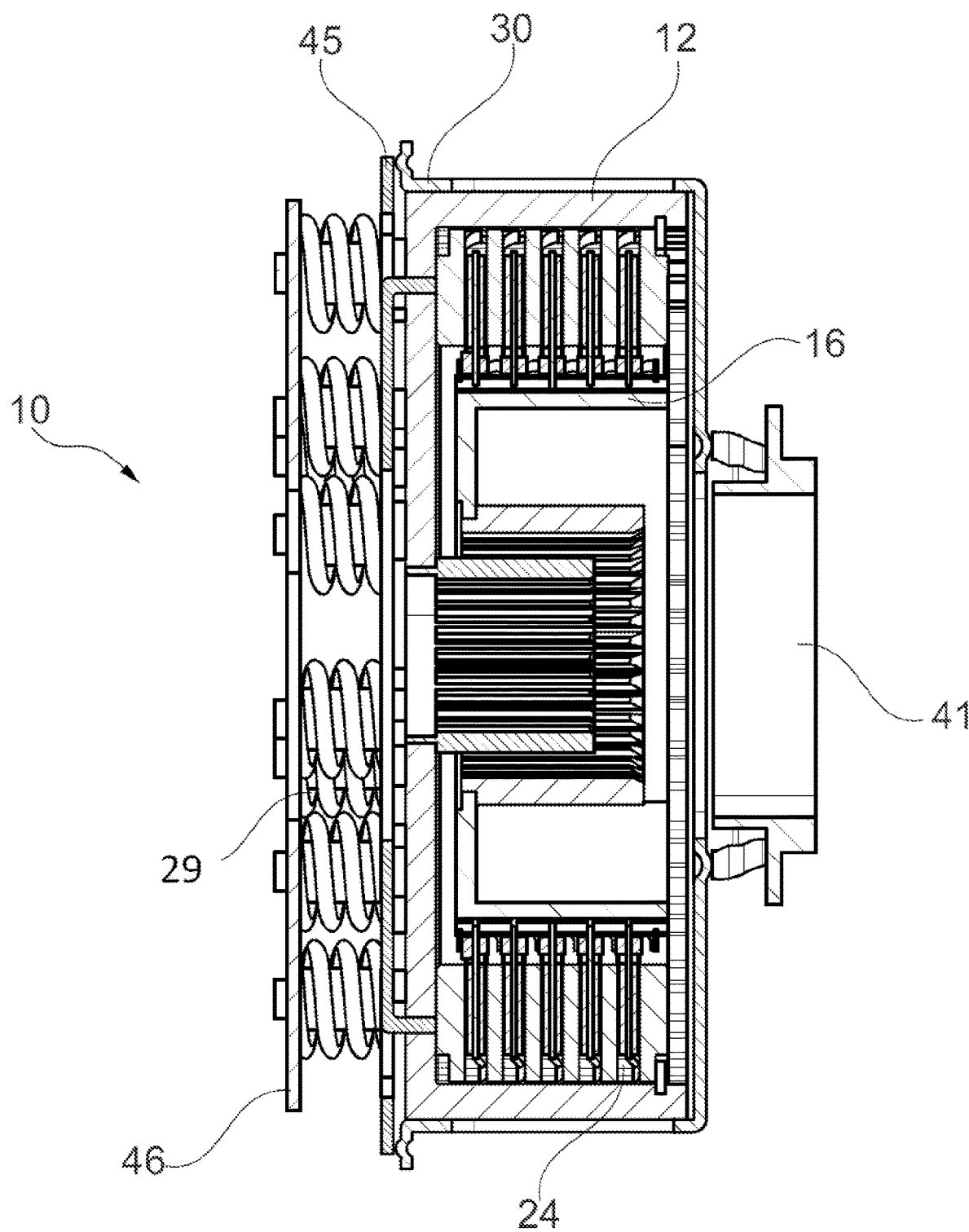
FIG. 5 is a schematic illustration showing an overview of a second implementation of the disclosed arrangement.

FIG. 5 shows a schematic illustration showing an overview of a second implementation of the disclosed arrangement 10 of FIGS. 1 to 3, whereby, in contrast, the clutch arrangement 10 comprises seven spring elements 29, which are arranged to the clutch arrangement 10 with a spring cover 46.

Furthermore, the clutch the clutch arrangement 10 comprises an actuating element 30, whereby the actuating element 30 comprises at least one coating material that prevents the build-up of hysteresis.

Further, whereby the actuating element 30 is arranged to the second rotating means 16.

Figure 6:
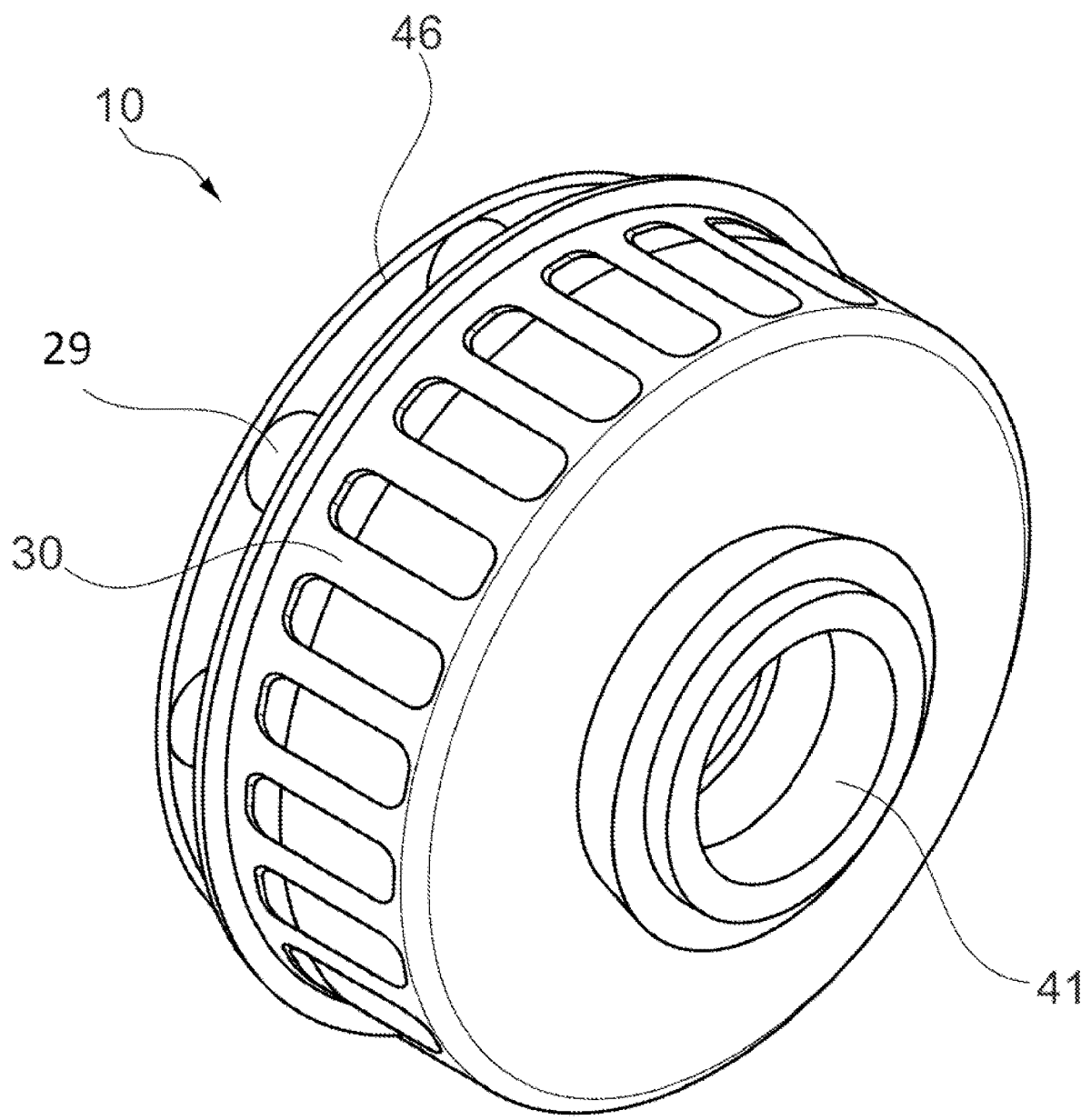
FIG. 6 is a schematic illustration showing a first overview of the disclosed arrangement with an actuating element.

FIG. 6 shows a schematic illustration showing a first overview of the disclosed arrangement 10 with an actuating element 30 of FIG. 5, whereby actuating element 30 covers a clutch carrier of the clutch arrangement 10.

Furthermore, the actuating element 30 may comprise a low friction coating material to prevent a hysteresis to build up, whereby parts of the clutch carrier outer diameter would have a step machined. This is to avoid the actuator getting stuck at high speeds due to deformation of the clutch carrier.

Figure 7:
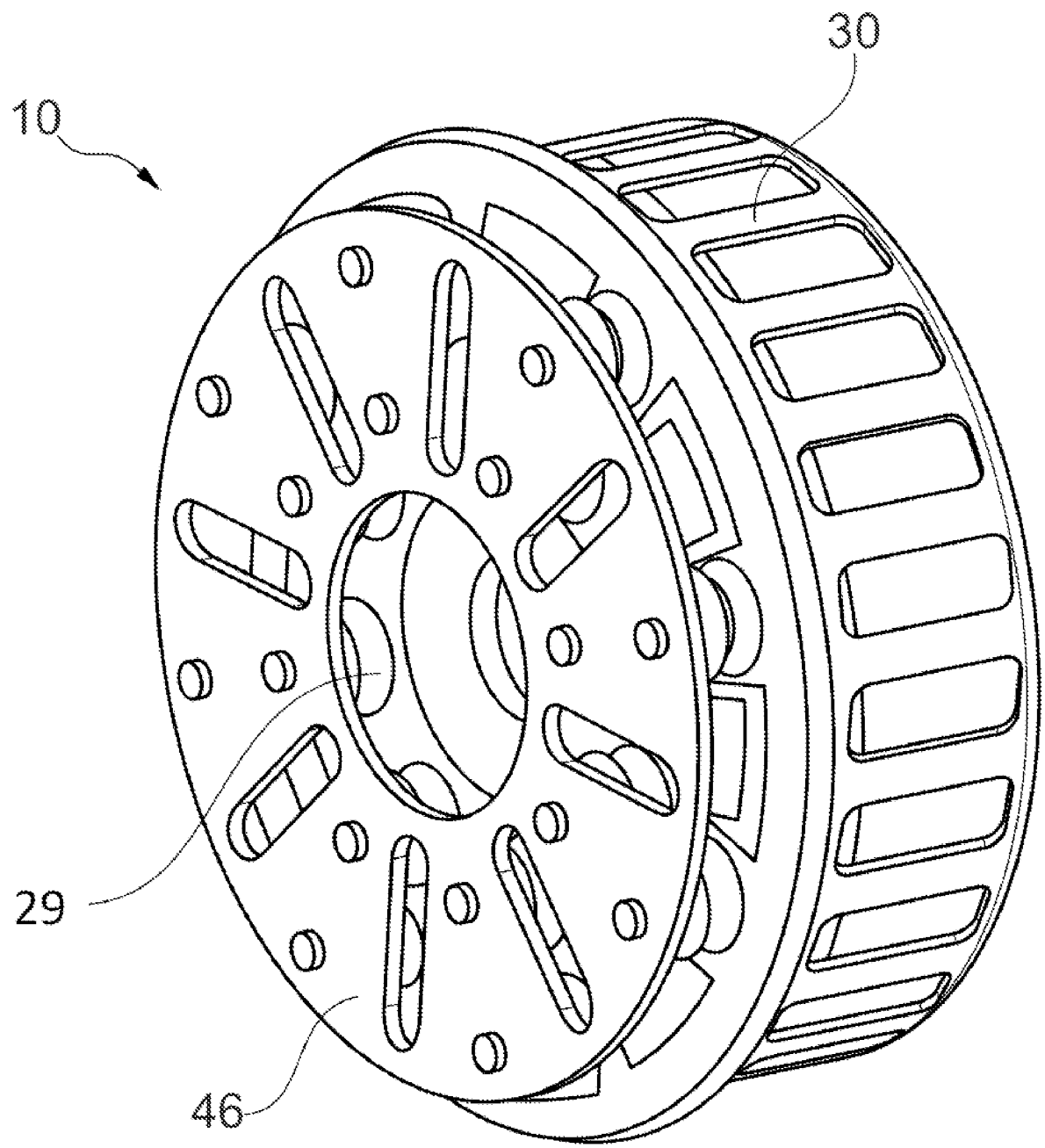
FIG. 7 is a schematic illustration showing a second overview of the second implementation of the disclosed arrangement with an actuating element.

FIG. 7 shows a schematic illustration showing a second overview of the disclosed arrangement 10 with an actuating element 30 of FIG. 5.

Other variations to the disclosed examples may be understood and effected by those skilled in the art in practicing the claimed subject matter, from the study of the figures, the disclosure, and the appended claims. In particular, respective parts/functions of the respective example described above may also be combined with each other. In particular, the present disclosure is not limited to specific modules, vehicle functions, user interfaces, user interface areas/fields and/or communication methods. In the claims, the word "comprising" does not exclude other elements or steps and the indefinite article "a" or "an" does not exclude a plurality. The mere fact that certain measures are recited in mutually different dependent claims does not indicate that a combination of these measures may not be used to advantage. Any reference signs in the claims should not be construed as limiting the scope of the claims.

As used herein, the terms "first," "second," "third," and the like in the description and in the claims, if any, distinguish between similar elements and do not necessarily describe a particular sequence or chronological order. The terms are interchangeable under appropriate circumstances such that the embodiments herein are, for example, capable of operation in sequences other than those illustrated or otherwise described herein. Furthermore, the terms "include," "have," and any variations thereof, cover a non-exclusive inclusion such elements but method, system, article, device, or apparatus that comprises a list of elements is not necessarily limiting to those elements, but may include other elements not expressly listed or inherent to such process, method, system, article, device, or apparatus.

As used herein the term "component" refers to a distinct and identifiable part, element, subsystem, or unit within a larger system, structure, or entity. It is a building block that serves a specific function or purpose within a more complex whole. Components are often designed to be modular and interchangeable, allowing them to be combined or replaced in various configurations to create or modify systems. Components may be a combination of mechanical, electrical, hardware, firmware, software and/or other engineering elements.

While this specification contains many specifics, these do not construe as limitations on the scope of the disclosure or of the claims, but as descriptions of features specific to particular implementations. A single implementation may implement certain features described in this specification in the context of separate implementations. Conversely, multiple implementations separately or in any suitable sub-combination may implement various features described herein in the context of a single implementation. Moreover, although features described herein as acting in certain combinations and even initially claimed as such, one or more features from a claimed combination may in some cases be excised from the combination, and the claimed combination may be directed to a sub-combination or variation of a sub-combination.

Even though particular combinations of features are recited in the claims and/or disclosed in the specification, these combinations are not intended to limit the disclosure of possible implementations. Other implementations are within the scope of the claims. For example, the actions recited in the claims may be performed in a different order and still achieve desirable results. In fact, many of these features may be combined in ways not specifically recited in the claims and/or disclosed in the specification. Although each dependent claim may directly depend on only one claim, the disclosure of possible implementations includes each dependent claim in combination with every other claim in the claim set.

LIST OF REFERENCE SIGNS

10 Clutch arrangement
12 first rotating means
14 at least one friction unit
16 second rotating means
18 at least one pressure unit
19 shim means
20 at least one second separator means
22 at least one first separator means
24 holding unit
26 gap
28 at least one spring unit
29 spring elements
30 actuating element
34 concentric shaft
40 clutch piston
41 release bearing
42 clutch input and output members
44 pivots
45 apply ring
46 spring cover

What is claimed is:

1. A clutch arrangement comprising:
a first rotatable clutch member with at least one friction unit and a second rotatable clutch member with at least one pressure unit; and
wherein the friction unit is configured to be moved between an open position and a closed position, wherein in the closed position, a force is transmitted between the first rotatable clutch member and the second rotatable clutch member and wherein in the open position, no force is transmitted between the first rotatable clutch member and the second rotatable clutch member; and
at least one shim connected to the first rotatable clutch member by a holding unit, whereby the shim is configured to prevent a contact between the friction unit and the pressure unit by maintaining a defined axial gap when the friction unit is in the open position; and wherein the clutch arrangement is configured to be a component of a vehicle.

2. The clutch arrangement of claim 1, wherein the clutch arrangement comprises two or more friction units and two or more pressure units, wherein the friction units are friction disks and wherein the pressure units are pressure plates.

3. The clutch arrangement of claim 1, wherein the clutch arrangement comprises five friction units and five pressure units.

4. The clutch arrangement of claim 2, wherein the clutch arrangement further comprises at least one first separator located between two pressure units and configured to position the two pressure units apart from each other, wherein the first separator is a separator spring.

5. The clutch arrangement of claim 2, wherein the clutch arrangement further comprises at least one second separator configured to position the friction units apart from each other, wherein the second separator is a snap ring.

6. The clutch arrangement of claim 5, wherein the at least one shim and the second separator is configured to provide a gap between the at least one friction unit and the at least one pressure unit.

7. The clutch arrangement of claim 6, wherein the gap is configured such that it prevents a drag torque in the clutch arrangement.

8. The clutch arrangement of claim 1, wherein the clutch arrangement is configured to be a closed clutch such that the clutch arrangement is initially in the closed position.

9. The clutch arrangement of claim 8, wherein the clutch arrangement further comprises at least one spring unit configured for holding the clutch arrangement in the closed position.

10. The clutch arrangement of claim 9, wherein the spring unit is at least one of a disc spring and a diaphragm spring.

11. The clutch arrangement of claim 9, wherein the spring unit comprises two or more spring elements.

12. The clutch arrangement of claim 11, wherein the spring elements are configured as coil spring unit.

13. The clutch arrangement of claim 9, wherein the clutch arrangement further comprises an actuating element.

14. The clutch arrangement of claim 13, wherein the actuating element comprises at least one coating material configured to prevent a build-up of hysteresis.

15. The clutch arrangement of claim 14, wherein at least one of the spring unit and the actuating element is arranged to the second rotatable clutch member.

16. The clutch arrangement of claim 1, wherein the clutch arrangement further comprises at least one concentric shaft on which at least one of the first rotatable clutch member and the second rotatable clutch member is arranged.

17. The clutch arrangement of claim 16, wherein the concentric shaft is configured to carry at least one of a clutch input member and a clutch output member.

18. A vehicle comprising a clutch arrangement, wherein the clutch arrangement comprises:
a first rotatable clutch member with at least one friction unit and a second rotatable clutch member with at least one pressure unit; and
wherein the friction unit is configured to be moved between an open position and a closed position, wherein in the closed position, a force is transmitted between the first rotatable clutch member and the second rotatable clutch member and wherein in the open position, no force is transmitted between the first rotatable clutch member and the second rotatable clutch member; and
at least one shim connected to the first rotatable clutch member by a holding unit, whereby the shim is configured to prevent a contact between the friction unit and the pressure unit by maintaining a defined axial gap, when the friction unit is in the opened position.

19. A method comprising,
opening a closed clutch of a clutch arrangement by applying an actuating force configured to counteract a closed force of the closed clutch; and
wherein the clutch arrangement comprises:
a first rotatable clutch member with at least one friction unit and a second rotatable clutch member with at least one pressure unit; and
wherein the friction unit is configured to be moved between an open position and a closed position; and
at least one shim connected to the first rotatable clutch member by a holding unit, whereby the shim is configured to prevent a contact between the friction unit and the pressure unit by maintaining a defined axial gap, when the friction unit is in the open position; and
wherein the method is configured for use of the shim in the clutch arrangement.

20. The method of claim 19, wherein the actuating force is configured to counteract the closed force of the closed clutch to move the closed clutch from the closed position to the open position; and wherein in the closed position a force is transmitted between the first rotatable clutch member and the second rotatable clutch member; and wherein in the open position no force is transmitted between the first rotatable clutch member and the second rotatable clutch member.

* * * * *